3,311,554
METHOD OF PREPARING W₂C CONTAINING A FINE DISPERSION OF CARBON
Hugh R. McCurdy and John R. Van Orsdel, Columbus, Ohio, assignors, by mesne assignments, to Hughes Tool Company, Houston, Tex., a corporation of Delaware
No Drawing. Filed Apr. 14, 1964, Ser. No. 359,790
7 Claims. (Cl. 252—12)

This invention relates to a process for preparing $W_2C$ plus C. More particularly, it relates to a process for preparing $W_2C$ plus C where the dispersed carbon is in the form of either graphite or diamond.

We have found that monotungsten carbide may be converted to $W_2C$ with dispersed carbon, either in the form of graphite or of diamond, by melting the monotungsten carbide at pressures greater than 25 kilobars. In the form of $W_2C$ plus dispersed graphite, the material produced by the method of this invention is useful for making bearings and other objects requiring wear-resistant materials. In the form of $W_2C$ plus diamond, the material resulting from the method of this invention is useful for making cutting tools.

It is, therefor, an object of this invention to convert simple hexagonal tungsten carbide (WC) into the denser hexagonal close-packed $W_2C$ plus carbon in the form of dispersed graphite flakes.

It is still another object of this invention to convert simple hexagonal tungsten carbide into the denser hexagonal close-packed $W_2C$ plus carbon in the form of dispersed diamond.

Still another object of this invention is to convert simple hexagonal tungsten carbide into $W_2C$ plus graphite or diamond by the simultaneous application of extreme pressures and extreme temperature.

Other objects and advantages of the present invention will be apparent from the following detailed description thereof.

In general, the method of this invention comprises the steps of cold pressing a charge of tungsten carbide powder (WC) in an ultrahigh pressure device and melting the tungsten carbide powder charge while subjecting said powder to a pressure in excess of 25 kilobars. In a preferred embodiment of this invention, the tungsten carbide powder charge is melted while subjected to a pressure of from about 60 to about 100 kilobars.

The process of the present invention may typically be carried out in an ultrahigh pressure device of the type commonly known in the art as a "girdle" type. In a typical procedure, hydrogen-reduced tungsten carbide powder was cold-pressed into a hole drilled horizontally in a pyrophyllite sample holder in such a girdle-type high-pressure device. Electrical contact was arranged by providing graphite lugs in contact with a steel disk which, in turn, contacted the tungsten carbide piston of the girdle device. A gasket of polyethylene and pyrophyllite was inserted to separate the "girdle" die from the upper and lower rams, prior to loading, a ram pressure of 215 tons (100 kilobars on the powder specimen) was applied to the pistons and the tungsten carbide powder was melted by discharging 810 joules of energy through the powder. This energy was supplied by a 240-microfarad condenser charged to 2600 volts. Examination of the reacted WC powder (by means of X-ray diffraction) showed a resulting structure of $W_2C$ plus graphite flakes.

In a similar manner, the present process may be carried out in the so-called "tetrahedral anvil" high-pressure device described in U.S. Patent 2,918,699. In one procedure, tungsten carbide was subjected to 70 kilobars pressure in a tetrahedral anvil device and was melted by discharging 540 joules of energy through the powder. X-ray diffraction examination of the resulting product showed strong $W_2C$ plus graphite lines and no WC lines in the pattern.

The product $W_2C$ plus carbon in the form of dispersed graphite flakes is obtained by subjecting WC powder to pressure in excess of 25 kilobars and up to about 110 kilobars.

A product consisting of $W_2C$ plus dispersed diamond may be obtained by subjecting WC powder to even greater pressures (110 to 200 kilobars) and melting the powder while it is subjected to such pressure.

It is to be particularly noted that it is critical to the present method that the WC powder be *melted* while subjected to ultrahigh pressure. It is not enough to merely heat the powder or to sinter it. Actual melting must be accomplished and preferably the melting is so rapid as to be almost instantaneous.

It has been noted that the method of this invention has been carried out in an ultrahigh pressure device of the "girdle" type. The device itself forms no part of the present invention, but is a well-known research tool. It is described in detail in U.S. Patent No. 2,938,998. Other devices are equally useful for carrying out the method of the present invention. For example, as mentioned above, the "tetrahedral anvil" device has been used to perform this invention. The so-called "belt" type device may also be used in carrying out the steps of the present invention. For a description of the "belt" device see "Ultra-High Pressure, High-Temperature Apparatus: The 'Belt'" by H. Tracy Hall, The Review of Scientific Instruments, volume 21, No. 2, February 1960, pp. 125–131.

A new and useful process for providing useful products having been hereinabove described, it is desired to further define the present invention by the appended claims. It is to be understood that the preceding description is illustrative only and that numerous equivalent procedures will occur to those skilled in the art. For example, melting of the WC powder charge need not be accomplished by discharge from a condenser, but may be brought about by self-resistance heating. Such equivalent alternative procedures are to be considered within the scope of the present invention, which is hereinafter further defined by the appended claims.

What is claimed is:

1. The method of converting monotungsten carbide to $W_2C$ with dispersed carbon comprising the steps of compressing a charge of tungsten carbide powder to an ultrahigh pressure and heating the tungsten carbide powder to a molten condition while simultaneously subjecting said powder to a pressure in excess of 25 kilobars, the percentage of dispersed carbon in the resulting product being approximately that formed by the reaction $$2WC = W_2C + C$$

2. The method of converting monotungsten carbide to $W_2C$ with dispersed carbon in the form of graphite comprising the steps of compressing a charge of tungsten carbide powder to an ultrahigh pressure and heating the tungsten carbide powder to a molten condition while simultaneously subjecting the said powder to a pressure in excess of 25 kilobars, the percentage of dispersed carbon in the resulting product being approximately that formed by the reaction $$2WC = W_2C + C$$

3. The method of claim 2 wherein the tungsten carbide powder charge is heated to a molten condition while being subjected to a pressure in the range of from about 60 to about 100 kilobars.

4. The method of claim 2 wherein the WC powder is heated to a molten condition by discharging an electrical condenser through the powder.

5. The method of converting monotungsten carbide to $W_2C$ with dispersed carbon in the form of diamond comprising the steps of compressing a charge of tungsten carbide powder to an ultrahigh pressure and heating the tungsten carbide powder to a molten condition while simultaneously subjecting said powder to a pressure in excess of 110 kilobars, the percentage of dispersed carbon in the resulting product being approximately that formed by the reaction $$2WC = W_2C + C$$

6. The method of claim 5 wherein the WC powder charge is heated to a molten condition while being subjected to a pressure in the range of from about 110 to about 200 kilobars.

7. The method of claim 5 wherein the WC powder charge is heated to a molten condition by discharging an electrical condenser through the powder.

References Cited by the Examiner
UNITED STATES PATENTS

| | | | |
|---|---|---|---|
| 2,344,552 | 3/1944 | Knochel et al. | 252—25 |
| 2,553,444 | 5/1951 | Dunn et al. | 241—20 |
| 2,980,475 | 4/1961 | Wolfe | 252—25 X |
| 2,992,900 | 7/1961 | Bovenkerk | 23—209 |
| 3,148,161 | 9/1964 | Wentorf et al. | 23—209 |

DANIEL E. WYMAN, *Primary Examiner.*

I. VAUGHN, *Assistant Examiner.*